Figure 20:
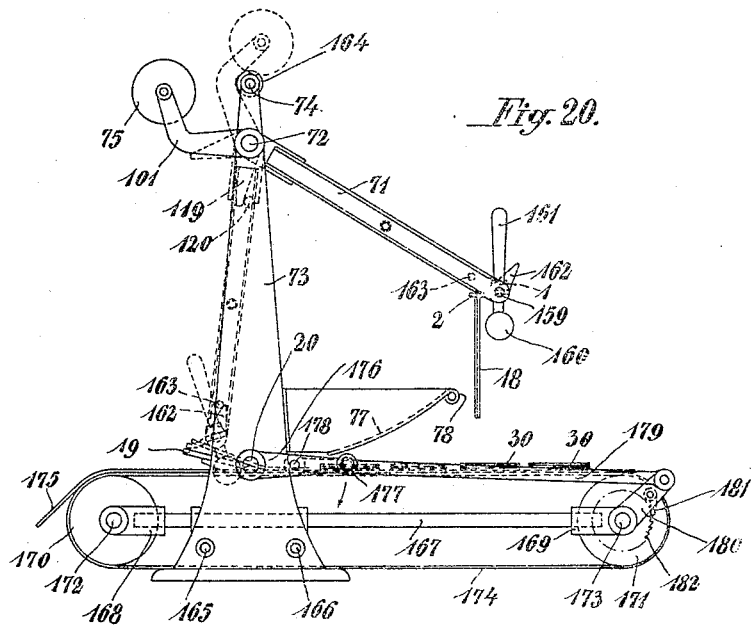

O. E. & P. W. FUNCK.
APPARATUS FOR HANKING FOOD PASTE THREADS.
APPLICATION FILED FEB. 18, 1908.
1,044,449.
Patented Nov. 12, 1912.
9 SHEETS—SHEET 1.
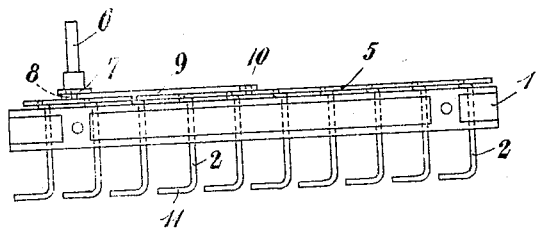
Fig. 1.
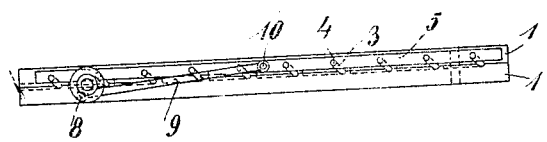
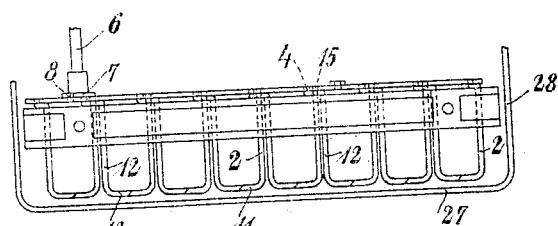
Fig. 2.
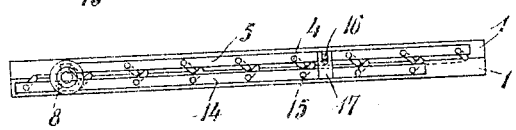
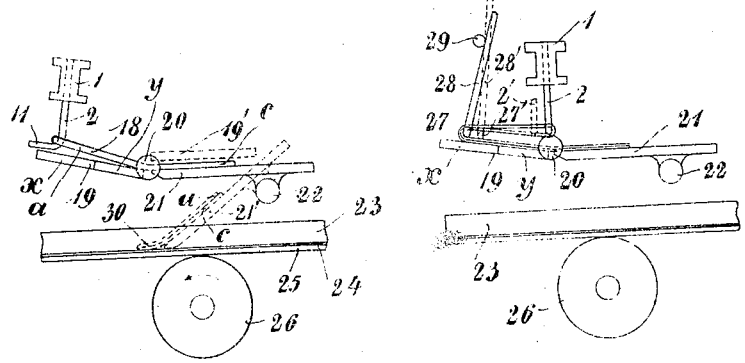
Fig. 3.                Fig. 4.

O. E. & P. W. FUNCK.
APPARATUS FOR HANKING FOOD PASTE THREADS.
APPLICATION FILED FEB. 18, 1908.
1,044,449.  Patented Nov. 12, 1912.
9 SHEETS—SHEET 2.
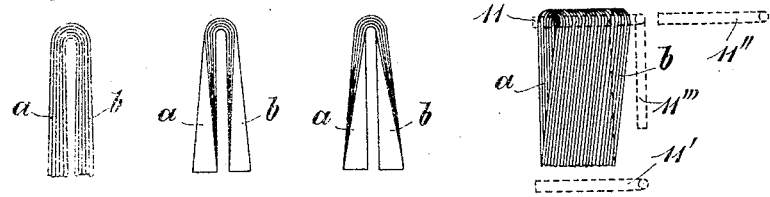
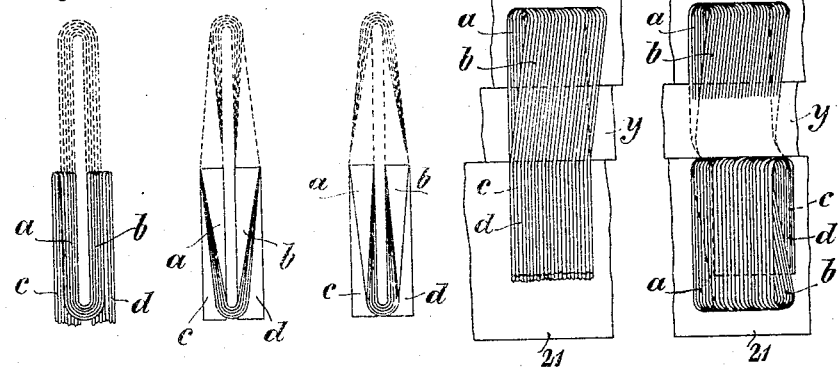
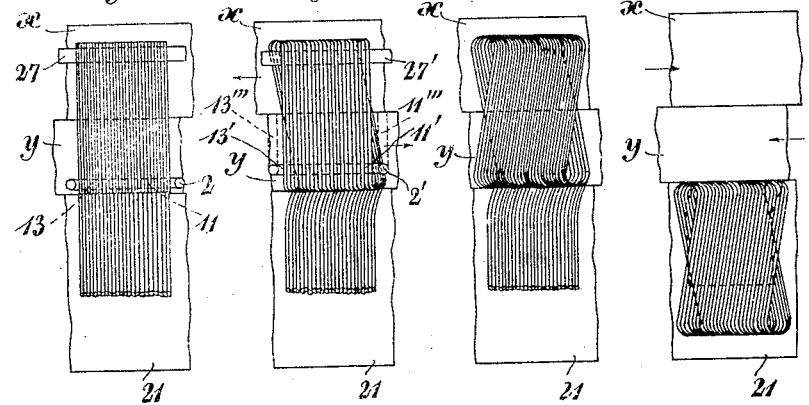

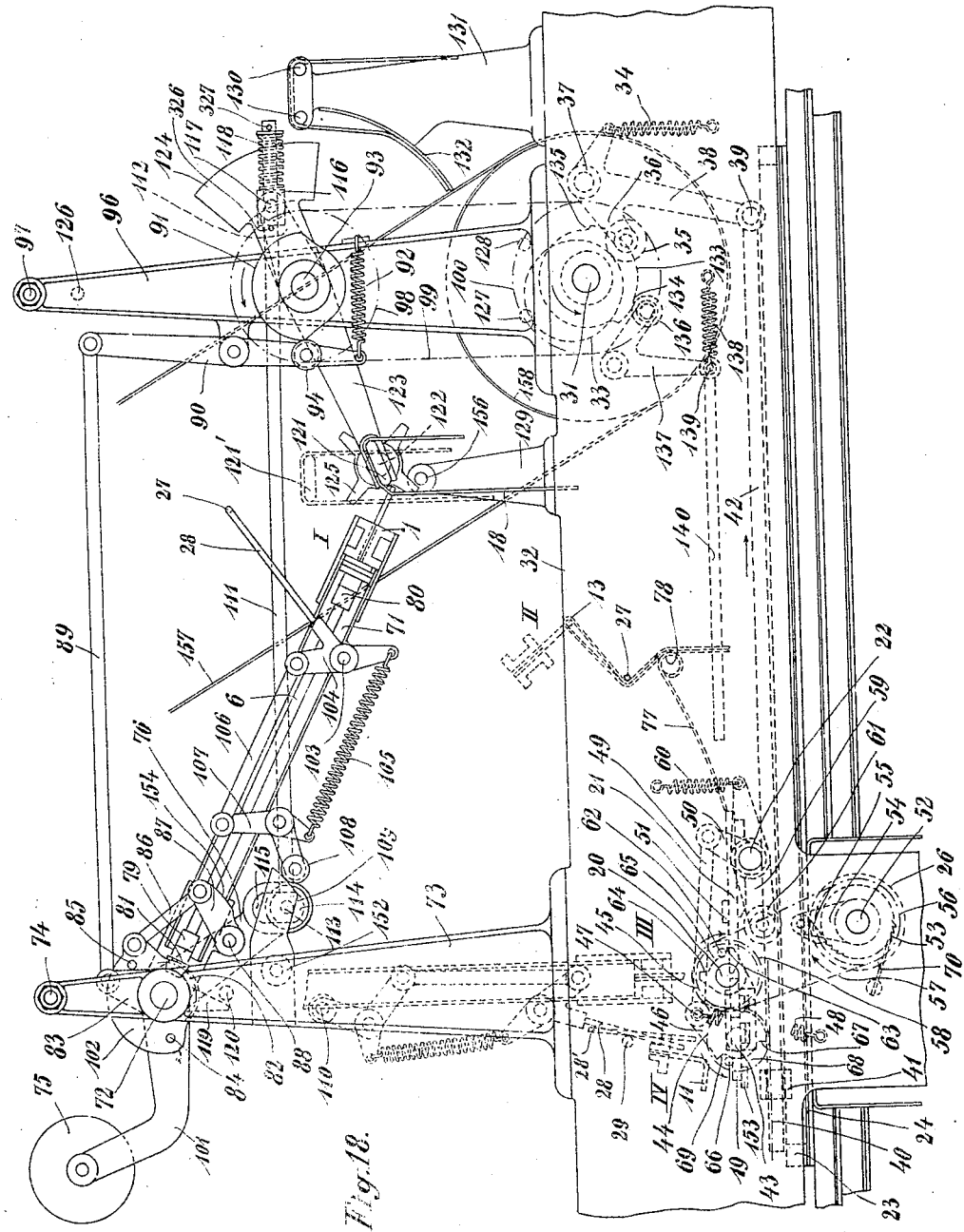

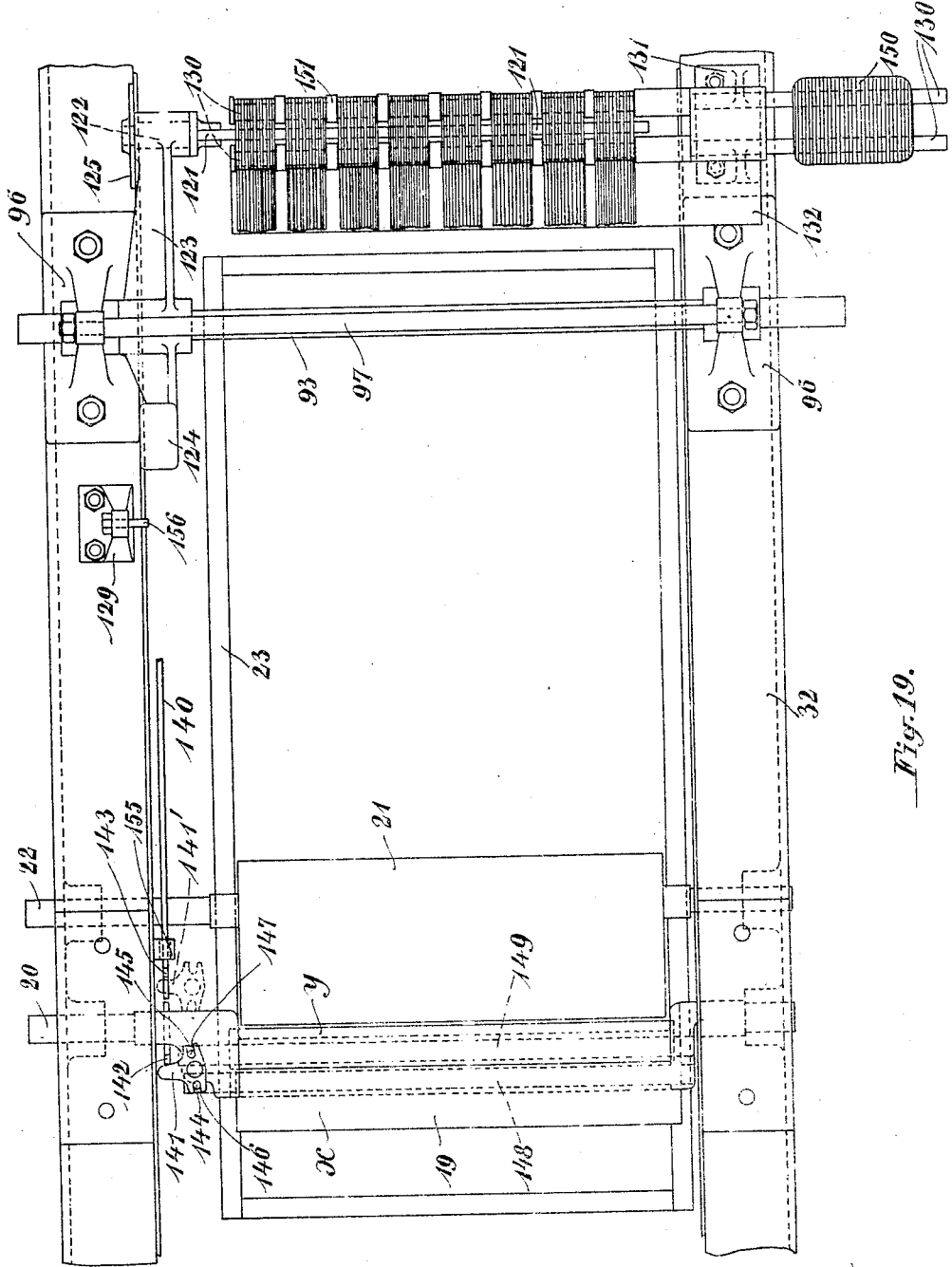

O. E. & P. W. FUNCK.
APPARATUS FOR HANKING FOOD PASTE THREADS.
APPLICATION FILED FEB. 8, 1906.

1,044,449.

Patented Nov. 12, 1912.
9 SHEETS—SHEET 5.

O. E. & P. W. FUNCK.
APPARATUS FOR HANKING FOOD PASTE THREADS.
APPLICATION FILED FEB. 18, 1908.

1,044,449.

Patented Nov. 12, 1912.

9 SHEETS—SHEET 6.

O. E. & P. W. FUNCK.
APPARATUS FOR HANKING FOOD PASTE THREADS.
APPLICATION FILED FEB. 18, 1908.
1,044,449.
Patented Nov. 12, 1912.
9 SHEETS—SHEET 7.
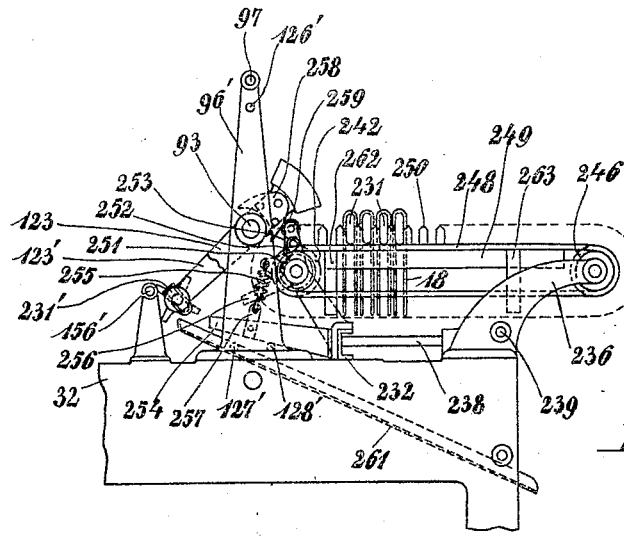
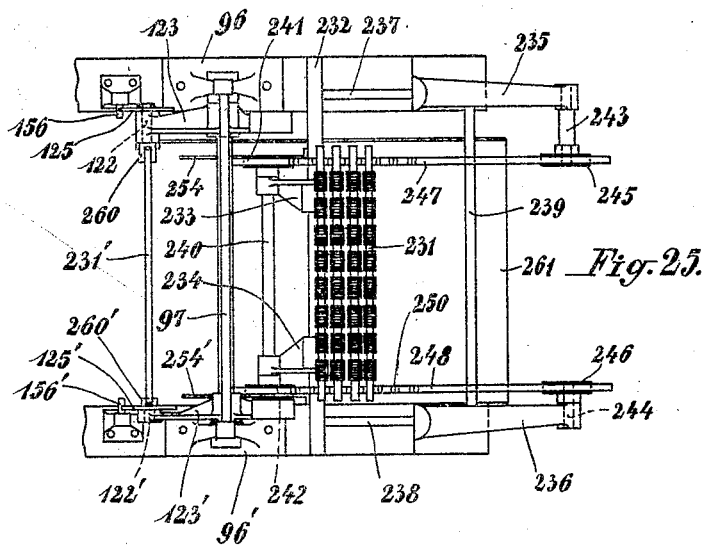

O. E. & P. W. FUNCK.
APPARATUS FOR HANKING FOOD PASTE THREADS.
APPLICATION FILED FEB. 18, 1908.

1,044,449.

Patented Nov. 12, 1912.

9 SHEETS—SHEET 8.

O. E. & P. W. FUNCK.
APPARATUS FOR HANKING FOOD PASTE THREADS.
APPLICATION FILED FEB. 18, 1908.
1,044,449.
Patented Nov. 12, 1912.
9 SHEETS—SHEET 9.
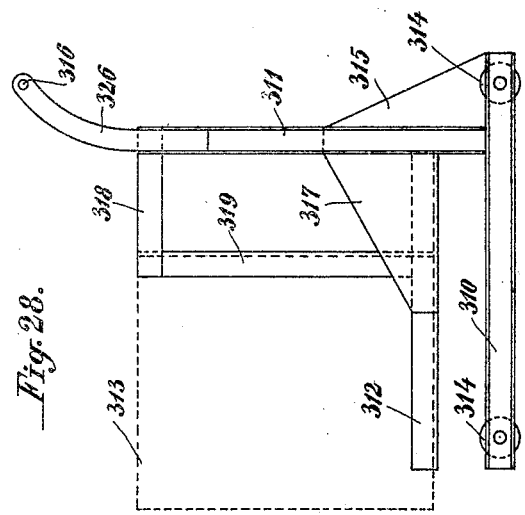
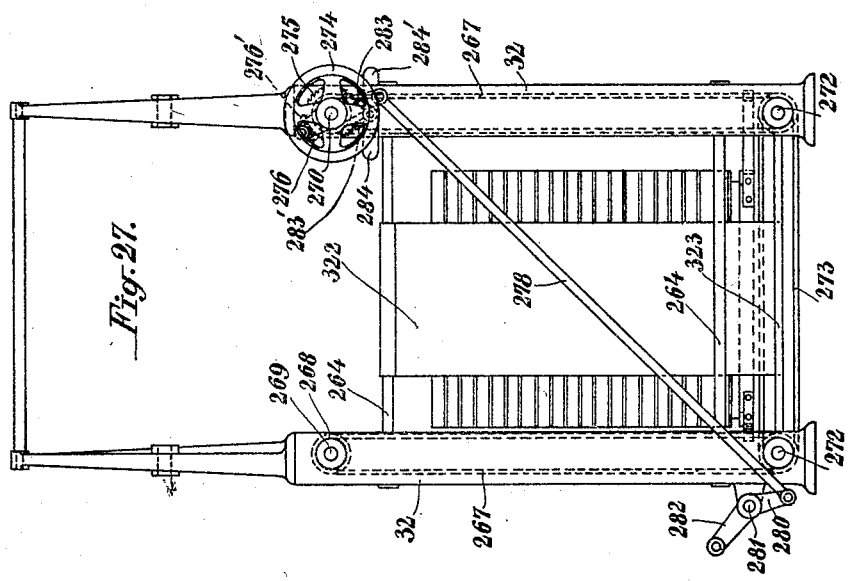

UNITED STATES PATENT OFFICE.

OTTO EBERHARD FUNCK, OF ROHRACKER, NEAR STUTTGART, AND PAUL WILHELM FUNCK, OF STUTTGART, GERMANY.

APPARATUS FOR HANKING FOOD-PASTE THREADS.

1,044,449.      Specification of Letters Patent.      Patented Nov. 12, 1912.

Application filed February 18, 1908. Serial No. 416,635.

*To all whom it may concern:*

Be it known that we, OTTO EBERHARD FUNCK, a subject of the German Emperor, residing at Rohracker, near Stuttgart, in the German Empire, and PAUL WILHELM FUNCK, a subject of the German Emperor, residing at Stuttgart aforesaid, have invented a new and useful Apparatus for Hanking Food-Paste Threads, of which the following is a specification.

In connection with the hanking of food paste threads such as vermicelli machines are known in the art in which the threads are deposited for their whole length upon flaps adapted to double them once or more times so as to hank them, fold upon fold. In such machines, however, it often happens that the layers when folded over by the flaps do not, especially as regards their end portions, fall in uniformly regular order upon the previously delivered portion of the hank, especially when such end portions are of considerable length. Further, arrangements are known according to which the food paste threads suspended in single hanks or—if folded or lapped over pins or rods—in double hanks, receive as they approach a delivery surface a curviform movement whereby without the aid of any further appliances hanks are deposited upon the delivery surface if the paste threads suspended in single hanks are cut at the completion of their delivery, and when the paste threads have been folded or lapped over pins or rods the latter are withdrawn therefrom in the direction of their length. Seeing that it is always impossible to bring the paste threads onto the delivery surface in such a manner that the ends of all the threads will reach the delivery surface simultaneously and will be followed by the next lengths in such a manner as is necessary to enable the paste threads to be arranged side by side, the bundles are bound to assume a loose, irregular appearance, which is particularly noticeable at the bends, where the loops of some of the threads project beyond the others.

The present invention has for its object to provide a machine in which the above drawbacks will be obviated. This object is attained in such a manner that the paste threads are engaged by a device hereinafter termed a "folder" and moved relatively to a delivery surface so as to bend thereon and to be stretched on both sides thereof during their delivery onto the supporting surface. The threads thus form at the point of engagement a loop with evenly stretched or drawn threads, as should be the case in a finished hank, and although the production of a composite hank necessitates the employment of further apparatus, this fact is of small consequence in proportion to the improvement made in the appearance of the hanks, which approaches that of hanks formed by hand.

Figure 21:
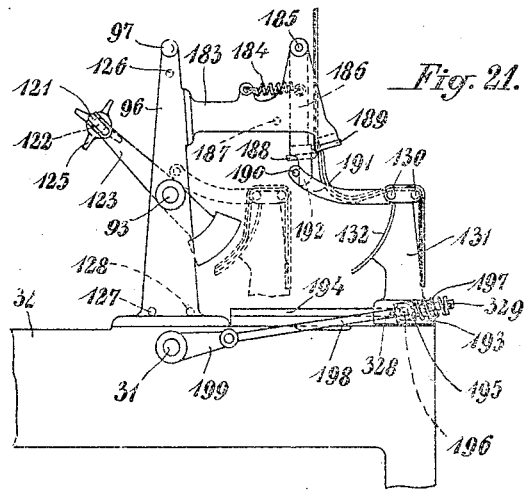
Figure 22:
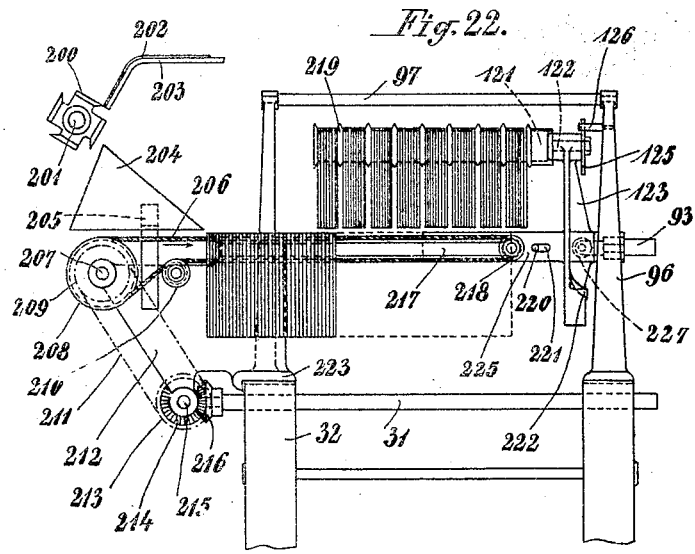
Figure 23:
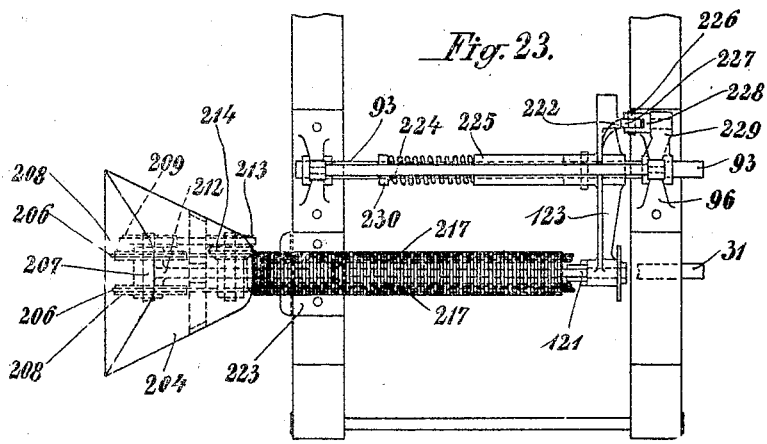
Figure 26:
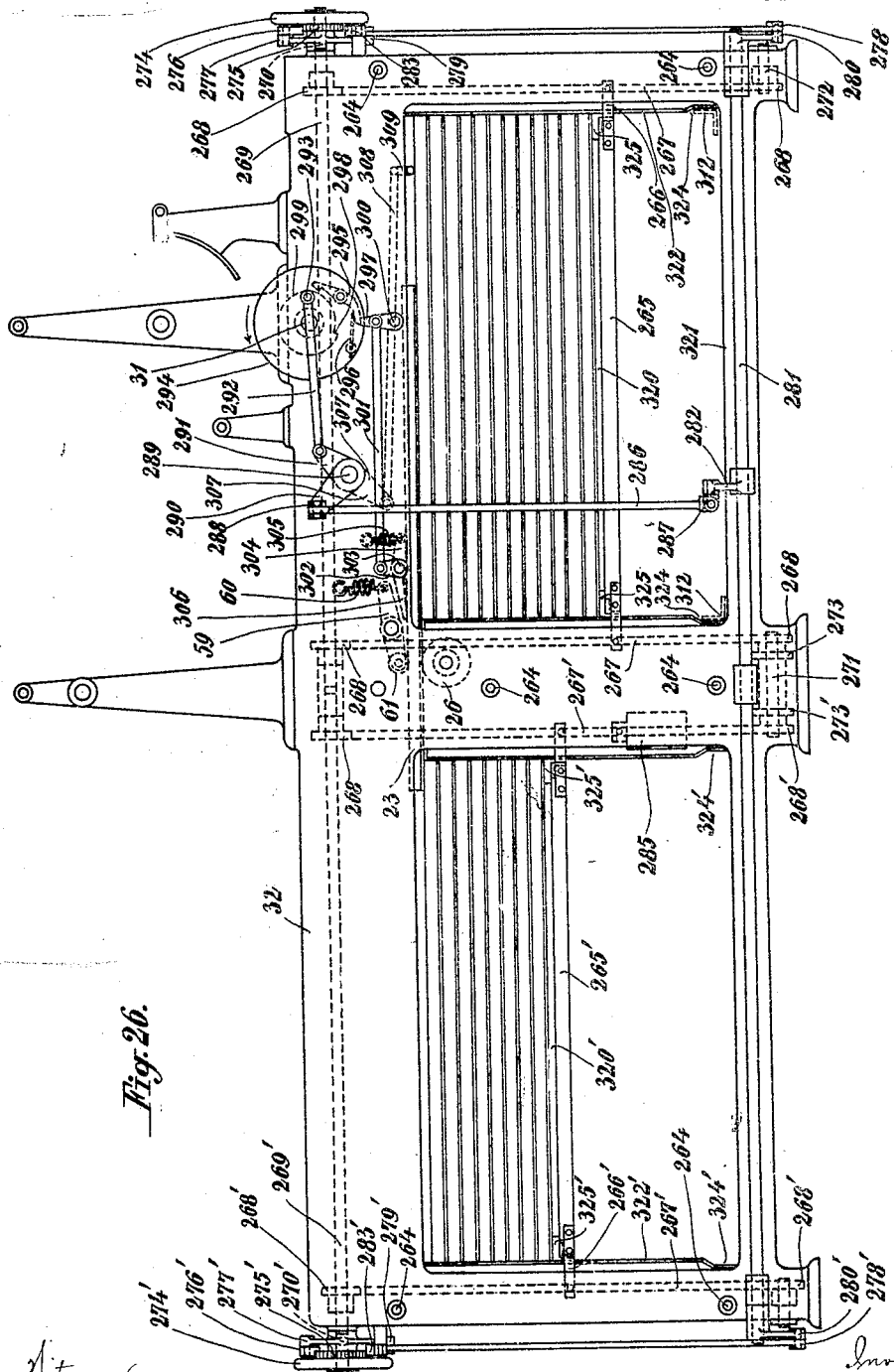

In the drawing, the double Figures 1 and 2 show two different forms of a typical means for hanking food-paste threads, while Figs. 3 and 4, with the introduction of further accessories, give a diagrammatic representation of the mode of operating the machine. Figs. 5 to 17 show different forms of hanks into which the food-paste threads can be shaped, and also the manner in which the hanks are formed. Figs. 18 and 19 represent a winding device applicable to the production of different forms of hank, both in lateral elevation and plan, it being assumed that the food-paste threads are fed into the machine by hand. Fig. 20 is a side elevation of a simplified winding device for only a single form of hank, the manipulation being entirely by hand. Fig. 21 is a side elevation of a device for feeding continuous strings of food-paste threads into the winding device according to Figs. 18 and 19. Figs. 22 and 23 represent in side elevation and in plan respectively, a device by means of which more particularly cut food-paste threads can be fed continuously into the machine; and Figs. 24 and 25 give, also in side elevation and in plan respectively, a device for effecting the introduction of food-paste threads which have been suspended on rods outside the machine. Fig. 26 is a side elevation of the under framework of the machine, and shows also the mode of arranging and moving the racks or trays intended to receive the finished hanks. Fig. 27 is an elevation of the under frame viewed from the right of Fig. 26, and Fig. 28 shows a framework drawn from out the machine, by means of which the empty racks or trays can be inserted into the machine and the full ones taken out.

In accordance with the invention the food-paste threads in the course of the process are engaged by a folder which in one convenient form comprises a wire or rod in such a manner as to bend over thereon on both sides of same and become stretched during their delivery. This is effected preferably by engaging the threads so that their ends hang down on either side of the folders and by moving the latter over a delivery surface or support so that the threads are subjected to a stroking action in the direction of their length. Such folders are preferably in the form of hooks or pins arranged one behind another in a row like the teeth of a rake. These hooks or teeth are adapted to take hold of the food-paste threads and release them with ease, this being more particularly the case when they are bent in such a manner that the projecting ends of the hooks diverge from the line connecting the hook centers or stand vertical thereon. The insertion of the food-paste threads into the hooks is made easier when the ends of the hooks are rotatably mounted, this arrangement also enabling the threads to be wound in hanks of different form. Two different forms of this kind of rake are shown, in lateral elevation and plan, in the double Figs. 1 and 2.

The rake in Fig. 1 consists of a divided rake head 1, 1, in which are rotatably mounted a number of pins or hooks 2. The hooks 2 are bent twice at the upper end, and form crank arms 3 and crank pins 4, which latter fit into corresponding holes in a fillet 5. A shaft 6 mounted above the rake head 1, 1, carries a crank pin 8 on a crank disk 7, which pin is connected by means of a connecting rod 9, with the pin 10 of the fillet 5, so that when the shaft 6 is turned, the fillet 5 is displaced and the whole of the hooks 2 are turned with it.

Whereas in the rake shown in Fig. 1, all the hooks are united in a system by means of the fillet 5, and all their projecting ends 11 are bent in the same direction, the rake 2 of Fig. 2 is provided with a second series comprising an equal number of hooks 12 which have their projecting ends 13 bent in the opposite direction and which are united by means of a fillet 14 engaging the crank pins 15 of the hooks 12. The crank pin 8 of the crank disk 7 fits directly into a hole bored in the fillet 14. When the shaft 6 is turned, the fillet 14 is displaced, and by means of a fork 17 acting on the pin 16 of the fillet 5, moves the fillet 5 at the same time, so that the two systems of hooks move in opposite directions.

The rake, comprising pins, hooks or teeth arranged in a row can be used in various ways for winding the food-paste threads into hanks, the rake either sufficing by itself for the forming of the hank, or else other means are employed by which the hanks are made in more complex shapes. Such means are illustrated, for example, diagrammatically in Figs. 3 and 4. They may consist of a flap 19 (Fig. 3) which is pivoted on the shaft 20, and by means of which, on turning the flap into the position 19', the one half (a) of a food-paste thread 18 can be laid upon the other half c; another means being a rod 27 (Fig. 4) by which the food-paste threads are bent over and stretched at the same time. Both these appliances may also be used in combination, as is shown for example in Fig. 4. Hereinafter the flap 19 will be referred to as the turning flap and the rod 27 as the stretcher.

In all the forms of winding device illustrated in the drawings, the hanks are formed by the food-paste threads being engaged by the teeth of the rake and drawn over a stroking surface on to which it is finally deposited. The simplest forms of hank produced in this way are shown in Figs. 5, 6 and 7. These are formed solely by means of the rake of Fig. 1, by turning the hook ends 11 in the direction of movement of the rake either before or during the stroking motion of the latter, so that on the return of the rake, the hanks are left lying on the stroking surface with their limbs $a$, $b$, parallel to one another. Fig. 5 shows the form of hank for thin or fine food-paste threads arranged in skeins. Figs. 6 and 7 show the form of hank for broad or coarse food-paste threads such as ribbon vermicelli four of which threads are arranged in superposition and rest edgewise on the delivery surface at the turning points but flat at the free ends.

The form of hank represented in Fig. 8 is obtained when the horizontally bent end of the hook 11 is arranged transversely of the direction of movement of the rake, and at the end of the stroking motion is either moved backward into the position 11' or pushed sidewise into the position 11'' or twisted into the position 11'''. Owing to the stiffness of the food-paste the threads of vermicelli no longer lie parallel to one another, but the top layer $b$, falls aslant on the under layer $a$. During the turning movement of the hook end 11, the food-paste threads easily get disarranged when the breadth of the hank is large in proportion to its length. In such cases, however, the form of rake shown in Fig. 2 can be advantageously used, in which, for each hank, the one hook 2 with long end 11 is replaced by two hooks 2, 12 with ends 11, 13 bent in opposite directions, the said ends meeting in the center of the hank, and are turned in the reverse direction into the positions 11''' and 13''', as can be seen from Fig. 15, for delivering the food-paste threads.

The hanks of Figs. 9 to 11 are obtained by the conjoint action of the rake 1 and a turning flap 19 (Fig. 3) or a thread stretcher 27 (Fig. 4) whereby the food-paste threads after having been turned around first on the rake teeth are subjected to a second bending which lays the halves $a$, $b$ of the skeins on to the halves $c$, $d$. The original position of the food-paste threads $a$, $b$, is marked by dotted lines. Fig. 9 shows the resulting hank in the case of thread vermicelli, Figs. 10 and 11 on the other hand those of ribbon vermicelli.

Figs. 12 and 13 illustrate a method of winding in which the food-paste threads are delivered as in Fig. 8, but in such a manner that they partly rest on the turning flap which consists of two parts, $x$, $y$. If the turning flap be moved in the direction indicated by the arrow in Fig. 13, the food-paste threads are subjected to a bending which is indicated by dotted lines and when the turning flap is turned over the hank shown in the lower part of Fig. 13 is obtained.

Figs. 14 to 17 show the formation of a hank twisted in the shape of an 8, and exactly the same appearance externally as the vermicelli hanks at present made by hand. Owing to the breadth of the hank, it is assumed in this case that the rake of Fig. 2 has been used. By means of the stretcher 27 (Figs. 2, 4, 14) the hook ends 11, 13 of the rake first bring the food-paste threads on to the turning flap $x$, $y$, and the delivery surface 21 (Fig. 14). The hook ends 11, 13 and the stretcher 27 are then moved a certain distance toward each other, into the positions 11′, 13′, 27′ (Fig. 15), by which means the food-paste threads become slack and fall down (parallel at first) on to the turning flap. By displacing the parts $x$, $y$, in the direction of the arrows in Fig. 15, the threads, which are now lying on the turning plate are twisted after the manner shown in Fig. 15. In passing over to Fig. 16, the hook ends 11, 13 are turned toward 11‴ and 13‴, and are then, together with the stretcher 27′, moved away from the hank, whereupon the threads fall down completely, and, in consequence of the stiffness of the paste, the upper threads come to lie in a slanting position on the lower threads, in the manner shown in Fig. 16. Finally the turning flap lays the finished hank on the delivery surface 21, as shown in Fig. 17.

The winding device shown in elevation and plan in Figs. 18 and 19, is arranged for winding hanks of the forms shown in Figs. 9 to 11 and in Fig. 17. In this case it is assumed that the hanks are to be laid on racks or trays 23 (Figs. 3 and 19) usually employed in the manufacture of food-paste preparations, which racks are provided for the reception of the hanks, with a bottom 24 of cloth or gauze, fastened on a rectangle of bars by means of a covering fillet 25.

In order to bring the hanks onto the bottom of the racks, the delivery surface 21, as shown more particularly in Fig. 3, is in the form of a flap which can be turned downward about a shaft 22 until it reaches the position 21′ and the finished hank 30 slides down the surface of the flap. By this means a portion of the hank reaches the bottom of the rack and, in consequence of the turning of the feed roller 26, is held and carried forward, whereupon the empty flap 21′ can be returned to the position 21. This flap is hereinafter referred to as the delivery flap.

The movement of the flaps 19 and 21 is effected in the arrangement shown in Figs. 18 and 19, by a shaft 31 which is mounted in the machine frame 32 and carries a disk 33, against the periphery of which a tension spring 34 presses a roll 35 which is mounted in the arm 36 of a three arm bell crank 37. To the arm 38 of the bell crank 37, a rod 42 is articulated by means of a pin 39, the said arm being formed at its opposite end 40 into a rack, and being guided by a guide 41. The rack 40 engages with a pinion 44, loosely mounted on a shaft 43, which pinion in turn engages with a pinion 45 able to rotate loosely on the shaft 20 of the turning flap 19. The shaft 43 also carries a loose setting arm 46, which is acted on at 47 by a spring 48, and which is coupled, by means of a connecting rod 49, with an arm 50 fixed on the shaft 22 of the delivery flap 21. In the position shown in Fig. 18, the spring 48 holds the delivery flap 21 in a horizontal situation, in which it rests against a stop 51 on the frame of the machine. Underneath the flaps 19 and 21 is mounted the feed roller 26, the shaft of which carries a fixed ratchet wheel 53 and also a loosely mounted setting arm 54. This arm 54 carries a pawl 55, which acts on the ratchet wheel 53, and is operated by means of an attached chain wheel 56 and chain 57 driven by the wheel 58 connected with the pinion 45. A double lever 59, mounted loosely on the shaft 22 of the delivery flap, is influenced by a spring 60 on the one side, and carries on the other side a roll 61, which presses the tray 23 firmly against the feed roller 26, to insure its being carried onward as the feed roller rotates.

The actuation of the flaps and the forward movement of the tray proceed in the following manner. When the shaft 31 is rotated in the direction indicated by the arrow it imparts a reciprocating movement through the disk 33 in conjunction with the bell crank 37 and the tension spring 34 to the rod 42. So long as the rod continues to move in the direction of the arrow, to the right, the teeth of the rack 40 cause the pinions 44 and 45 to turn in the direction shown by the arrows. Hereby the pin 62 on the pinion 45 engages with the contact 63 on the turning flap and carries the latter around for a little more than a quarter turn, whereupon it falls by its own weight on to the delivery plate 21. In consequence of the provision of a gap 65 between the two contacts 63 and 64, no hindrance is opposed to this descent. During the further rotation of the pinions 44 and 45, the pin 66 on the pinion 44 meets the contact 67 of the setting arm 46 and carries this latter along with it. As soon as the spring 48 comes to the other side of the vertical axis of the shaft 43, it quickly completes the lowering of the delivery plate 21 (which has already been moved by the connecting rod 40) into the position 21' of Fig. 3. The contact 67 of the setting arm consequently hastens past the pin 66, a second contact 69, separated from the contact 67 by a wide gap 68, nevertheless remaining at an appreciable distance from the pin 66. At the same time the chain wheel 58, in conjunction with the chain 57 and the chain wheel 56, has moved the setting arm 54 with the pawl 55 idly over the ratchet wheel 53, which is prevented from moving by a spring dog 70.

During the succeeding return stroke of the rod 42 and the pinions 44, 45, the pawl 55 carries with it the ratchet wheel 53 and the feed roller 26; the tray 23 is pushed forward and takes away on its bottom 24 the finished hank from the delivery flap 21 (Fig. 3). Shortly after the commencement of the return movement, the pin 62 of the pinion 45 encounters the contacts 64 of the turning flap and carries the latter along with it until, after about a quarter of a turn, it falls of its own accord into the horizontal or nearly horizontal position shown in Fig. 18 so as to rest on the stop 153 provided on the frame of the machine. During the descent of the turning flap, the contact 63 has again collided, or nearly so, with the pin 62, as shown in the figure. Furthermore, after the pin 66 of the pinion 44 has passed through the tooth gap 68, the setting arm 46 and with it the delivery flap 21 are turned back, as the tray nears the end of its forward stroke, and the spring 48, which has withdrawn to the farther side of the center of shaft 43, has brought the delivery flap into the horizontal position again, the contact 69 having at the same time moved a little ahead of the pin 66.

The rake 1, which lays the food-paste threads on the flaps 19 and 21, is suspended, by one or more arms 71, from the shaft 72, which is journaled in standards 73 mounted on the frame of the machine and connected at the top by a cross-bar 74. To insure quiet running of the machine a counterweight 75 is provided on a rearward extension 101 of the rake arm, which weight entirely or partially counterbalances the rake 1 and its accessories. The shaft 72 is set in rocking motion by means of the arm 76, so that the food-paste threads 18 to be moved toward the flaps are drawn over a stroking plate 77, which is well rounded at the contact edge 78. The shaft 6 for turning the hook ends of the rake is mounted on the arm 71 in bearings 79 and 80 and carries at its upper end a bevel pinion 81, engaging with a toothed quadrant 82, which is provided on a disk 102 loosely mounted on the shaft 72. The disk 102 carries two pins 84 and 85, and is connected, by means of a coupling rod 86, with an arm 87 mounted on a pivot 88 on the rake arm. The pins 84, 85 serve as contacts for the setting arm 83, which is actuated through the coupling rod 89 and the double lever 90 by a cam or non-circular disk 91, on the periphery of which a roll 94, mounted in the lever 90, rides under the influence of a spring 92. The shaft 93 of the cam disk 91 is mounted in standards 96 which are connected together at the top by a cross bar 97. Chain wheels 98 and 100 and chain 99 transmit motion to the shaft 93 from the main shaft 31.

The stretcher 27 (Figs. 2 and 18), which extends parallel with the rake 1 and is provided with lateral limbs 28, is connected by means of the latter with a shaft 103 which is mounted on the rake arms 71 and is turned by a three-arm bell-crank 104. This bell-crank is on the one hand, under the influence of a spring 105 supported by the rake arm, and on the other hand (by means of a coupling rod 106) under the influence of a two armed bell crank lever 107, which carries a roll 108, with which, under the influence of the spring 105 it presses against a guide curve or cam surface 109 mounted on the standards 73. This cam surface is of such profile that during the downward turn of the rake arm the bell crank lever 107 turns the stretcher 27 so quickly that it has completed its stroke in relation to the rake by the time the rake has reached the position II, in which the food-paste threads come in contact with the contact edge 78 of the stroking surface 77. A corresponding extension of the roll pivot 110, which makes contact with the arm 71, checks any further advance of the stretcher, so that the roll 108 can pass away from the guide curve without disadvantage during the further movement of the rake.

The arm 76 for operating the rake is connected with a crank 112 on the shaft 92 by means of a coupling rod 111. Since, according to the kind of hank required, the lower dead point of the rake must be at III or IV, the pin 113 connecting the coupling rod 111 and the arm 76 is mounted in a special articulation piece 114, which can be adjusted and fixed in any desired position in a slot or elongated opening 115 in the arm 76. If the articulation piece is below, as shown in the figure, the throw of the rake is shorter than when the articulation piece is moved back to the upper end of the slot. In the one case the rake swings only as far as the position III, in the other it moves as far as the position IV.

A special articulation piece 116 is also provided for connecting the coupling rod 111 with the crank 112, which piece is able to turn in the pivot 117 of the crank, and in which the rod 111 can be displaced by compressing the spring 118 in so far as this movement is not prevented by the pins 326, 327. This takes place when an arm 119, connected with the rake shaft, encounters the stop 120 on the bearing standard 73, the rake then remaining at rest for a short time in its upper terminal position, a condition that is necessary or advisable when the hooks of the rake 1 have to take off the food-paste threads automatically from the rod 121.

The rod 121, which will be hereinafter referred to as the "transmitter," is intended to engage with the food-paste threads at the place where they are fed into the machine and to hand them over in a suitable manner to the rake 1. It is rotatably mounted by means of a pivot 122, on the outer end of an arm 123, which is rigidly connected with the shaft 93 and is extended backward for the purpose of carrying a counterweight 124. With the pivot 122 is connected a star 125 for the purpose of making the contacts 126, 127, 128 on the bearing standards 96 operate in conjunction with the pin 156 on a small bearing pillar 129, so that a certain amount of rotation is imparted to the transmitter rod every time. When the shaft 93 is turned, the transmitter 121 takes the food-paste threads from a two-part support or fork 130, which is mounted on a standard 131, and on which the food-paste threads are laid singly by hand, by taking them from the bundle 150 (Fig. 19) and laying them in the separate compartment between tie collars or rings 151 on the fork 130. A plate 132 provided on the standard 131 prevents the downwardly hanging threads from getting in the way of the transmitter rod 121.

Whereas the transmitter 121 in passing between the teeth of the fork 130 is arranged tangentially toward its circuit, in order that it may engage the threads with its narrow side, it is turned through 90 degrees in a radial direction when the star 125, mounted on its pivot 122, meets the contact 126. When it has arrived in the radial position at the point 121', the rake has meanwhile reached a position a little over the position I. By this means the ends 11, as shown in position IV of the rake, are turned in such a manner as to be parallel to the direction of movement of the rake, and are consequently able to pass between the individual hank threads 18 hanging down from the transmitter 121. During a momentary pause of the rake, under the influence of the spring 118, the hook ends are turned through 90 degrees, so that during the backward swing of the rake and the further movement of the transmitter 121 in the position indicated by the unbroken lines, the food-paste threads are engaged by the hook ends of the rake. At the same time, in this position, the star 125 encounters the contact 156, whereby the transmitter is again turned in a direction tangential to its circuit and the removal of the threads from the transmitter can be effected with ease. Finally, by the impact of the star 125 with the contacts 127 and 128, the transmitter is turned through 180 degrees and is thus restored to its original position.

According to the shape of hank desired, a different rake is mounted in the rake arms 71, and the distribution of the hank groups on the fork 130 must be arranged accordingly. The method of moving the rake hooks in winding the hanks varies according to the rake; but the method of removing the food-paste threads from the transmitter 121 remains the same in all cases, namely that while the rake is at its top dead point, the setting arm 83 is actuated by the cam disk 91, the double lever 90 and the coupling rod 89, carries the disk 102 with it, under the influence of the pin 85, and, by means of the toothed quadrant 82, causes the bevel pinion 81 on the shaft 6 to revolve, thus setting the hook ends transversely toward the suspended food-paste threads. During the ensuing downward movement of the rake, the pin 85 moves away from the setting arm 83, which remains stationary while the pin 84 approaches it on the other side.

In winding hanks according to Figs. 5, 6, 7 and 9, 10, 11, the rake shown in Fig. 1 is inserted after the removal of the stretcher 27, the standard 73 being provided with a contact roll 152, against which a lateral guide curve or cam edge 154 on the arm 87 presses as soon as the food-paste threads have arrived at the contact edge 78 of the stroking plate 77. During the further movement of the rake, the arm 87 turns the disk 102, and consequently the hook-turning shaft 6 by means of the coupling rod 86, so as to bring the hook ends 11 into the direction of motion of the rake. The food-paste threads draw over the stroking plate 77 and, as shown in Fig. 3, are laid on the flap 19, the rake arriving at the position IV of Fig. 18. During the return stroke of the rake, the food-paste threads remain stationary and the hook ends retain their position perpendicular to the rake, until they are again set parallel to the rake, by means of the non-circular disk 91, when the rake has reached its upper terminal position, in order that they may engage with a further charge of food-paste threads.

For producing hanks according to Fig. 17, the rake of Fig. 2 and the stretcher 27 are put in, the contact roll 152 being removed from the standard 73. The food-paste threads are laid on the flaps 19 and 21 by the descending rake, as shown in Fig. 4, the rake attaining the position III of Fig. 18. During the further movement of the rake, the stretcher 27 and hook ends 11, 13, are caused to draw together, according to Figs. 4 and 15, by the limb 28 of the stretcher engaging with a contact 29, whereby the stretcher rod is moved back to 27′, whereas the hook ends move onward to 11′, 13′. Consequently the food-paste threads, in so far as they are not lying on the stretcher and hook ends, fall in a slackened condition on the turning flap 19, the parts $x$, $y$, of which have now to be moved in order to bring the threads into the position shown in Fig. 15.

For the purpose of moving the parts $x$, $y$, fillets 148, 149 are provided in the substance of the turning flap (Fig. 19) which fillets engage in recesses 146, 147 of a three-arm lever 141 by means of pins 144, 145. A rod 140 (Fig. 18) which is connected by a pivot 139 with the bell crank lever 137, and is actuated, partly by a spring 138 and partly by the cam 133 (which is in contact with the roll 136 of the bell crank lever 137) is bent, after passing through the guide 155 (Fig. 19), under the shaft 20 of the turning flap, and carries two contacts 142, 143, the former of which brings the lever 141 into the position indicated by the unbroken lines, when the projection 134 (Fig. 18) of the cam disk 133 has moved away from below the roll 136.

After the parts $x$, $y$ have been moved in this manner into the position shown in Fig. 15, the setting arm 83, operated by the coupling rod 89, carries with it the pin 84 (which has come in contact with it through the rocking motion of the rake) and turns the disk 102, whereby the hook ends are brought into the position 11′′′, 13′′′ of Fig. 15, so that on the return of the rake and the stretcher, the food-paste threads fall on the turning flap in the manner shown in Fig. 16. As soon as the rake has turned back over the position II, the stretcher is moved back into the position indicated by the unbroken lines, by means of the action of the guide curve or cam edge 109 on the roll 108, in such a manner as to prevent contact with the transmitter 121 which is descending.

The return movement of the fillets 148, 149 is effected by the second contact 143 of the rod 140, which, after the turning flap has been turned into the position 19′ of Fig. 3, presses the lever 141 back out of the dotted-line position 141′ of Fig. 19 into a position parallel to the lever 141 indicated by the unbroken lines, directly the previously reversed rod 140 is moved toward the plate by the projection 135 of the disk 133. Since, in winding the hanks according to Figs. 5, 6, 7 and 9, 10, 11, the parts $x$, $y$, must not be moved, the lever 141 is removed in these cases.

In Fig. 18 it is assumed that the machine is operated by means of a driving belt 157 and driving pulley 158. The speed of drive must in this case be adjusted to the skilfulness of the attendant, unless it be preferred to stop the machine at every fresh cycle of operations long enough to enable the attendant to recharge the fork 130 with a fresh charge of thread skeins. In many cases it will be sufficient to replace the driving pulley by a hand crank, so that the attendant can turn the shaft 31 once himself after the fork has been recharged with skeins. If the hanks are only to be wound according to Figs. 5, 6, 7 and 9, 10, 11, the transmitter rod 121 may also be dismounted, since the attendant can hang the skeins directly in the teeth of the rake, so long as the latter remains at rest in its upper terminal position, instead of hanging them on the fork 130.

A machine in which the method of attention is simplified in a similar manner is illustrated in elevation in Fig. 20. The rake 1 is here mounted on pivots 159 on the ends of the rake arms 71, so as to be capable of rotation, and is held by the counter weight 75, in the position indicated by the unbroken lines, in which the arm 119, connected with the rake shaft 72, engages with the contact 120 of the bearing standard 73, which is connected with a corresponding standard on the opposite side of the machine by the cross-bars 74, 165 and 166. The rake teeth 2 are bent only slightly or not at all, and are maintained in a horizontal position under the influence of the weight 160, so that the food-paste threads 18 can be placed on them conveniently. The rake is operated by hand, by taking hold of the handle 161 and moving it down into the position indicated by the dotted lines, whereupon the counterweight arm 101 encounters a ring or collar 164 on the crossbar 74, and an arm 162, connected with the rake, strikes against the pin 163 of the one rake arm 71. By this means the food-paste threads are drawn over the contact edge 78 and stroking surface 77, and lie partly on the turning plate 19 and partly on the delivery plate for the finished hanks.

On the rake being moved backward, the threads remain on the delivery surface and turning flap 19, and the rake returns alone into the position indicated by the dotted lines. This done, the turning flap 19 is turned by means of a separate crank 176 and handle 177. In order to dispense with the delivery flap 21 of Fig. 3, there is employed a delivery surface consisting of a cloth or sheet 175 of paper which is supported and carried onward by the traveling belt 174, and is removed and deposited on rigid trays or racks when filled with hanks 30. The belt 174 is led over drums 170, 171, the shafts of which 172, 173, are supported on either side of the machine, by bearings 168. 169 and bearing rods 167 on the standards 73. The feeding motion of the belt 174 with delivery surface 175 is imparted to it by a pawl 181, which is attached to a setting arm 180 on the shaft 173 and engages with a ratchet wheel 182 fixed on the shaft 173. The arm 180 is connected with a pivot 178 on the hand crank 176 by means of a coupling rod 179.

When the hand crank 176 is turned in the direction of the arrow, the turning flap 19 deposits the portion of the food-paste threads it has taken up upon the portion already lying on the delivery surface 175, and the coupling rod 179 pulls the setting arm 180 and the pawl 181 back idly over the ratchet wheel 182. On turning back the turning flap into the position indicated by the unbroken lines, the ratchet wheel 182 and the drum 171 and belt 174 are moved forward, room being thereby made for the reception of the next hank.

The device shown in elevation in Fig. 21 is for the purpose of feeding the machine according to Figs. 18 and 19 with continuous threads of food-paste, such as are supplied from paste presses for instance. Here again the transmitter rod 121 is used, and is arranged, together with a star 125 so as to be capable of rotation on a pivot 122 at the outer end of an arm 123, the shaft 93 of which is mounted on two bearing standards 96 which are fixed on the frame 32 of the machine and connected by the crossbar 97. The arm 123 is turned, as described above, at uniform velocity, the transmitter rod 121 meanwhile lifting the food-paste threads out of a fork 130, to be then turned successively by the contacts 126, 127 and 128, which act on the teeth of the star 125. The standard 131 carrying the fork 130 and provided with catch plate 132, is here mounted on a slide 193 which is moved along a track 194 resting on the machine frame.

The movement of the slide 193 and fork 130 is effected by means of a coupling rod 198, which is connected with a crank 199 mounted on the shaft 31 and capable of movement accompanied by the compression of the spring 197, so far as is permitted by the pins 328, 329—in an articulation piece 195, which is pivotally mounted on the pin 196 in the slide 193.

The food-paste threads are introduced, suspended from above, in such a manner that they pass between knives 188, 189 one of which, 189, is fastened to the bracket 183 connected with the standard 96, while the other is suspended from a lever 186, the shaft 185 of which is mounted in the bracket. The lever 186 is under the influence of a spring 184 and projects by means of a downward extension 192 into the path of a pin 190 provided on the arm 191 of the standard 131.

In the position of the standard 131 indicated by the unbroken lines, the food-paste threads are just being cut off by the pair of knives 188, 189, and ready to fall instantly on to the fork 130. Hereupon the crank 199 moves the slide 193 out of its dead point at the right-hand side toward the left, the knife 188 moving away from the knife 189 under the influence of the spring 184, and leaving a free passage for the food-paste threads coming from above. In the dead point on the left, indicated by the dotted lines, the slide 193 comes in contact with the foot plate of the bearing standard 96 and remains stationary, with the spring 197 compressed, until the transmitter rod 121 has passed through the teeth of the fork 130. When the transmitter has lifted the food-paste threads in this manner, the standard 131 is moved toward the right again by the crank 199, carrying with it the threads which in the meantime have moved for a certain distance between the knives 188, 189, in such a manner that they hang down partly on the right side of the fork and partly over the fork in the shape of a loop, as shown in the figure. Toward the end of the stroke the pin 190 provided on the arm 191 carries with it the extension 192 of the arm, and the threads are cut off, whereupon the slide again moves to the left and the cycle of operations is repeated.

Figs. 22 and 23 show a device by means of which the food-paste threads that have been cut off in definite lengths are fed continuously into the winder or hanking device according to Figs. 18 and 19. For this purpose the machine frame 32 is provided with an attachment or bracket 212 in which is mounted a shaft 215 operated from the bevel pinion 216 of the main shaft 31 by a bevel pinion 214. By means of the chain 211 and chain wheels 213, 209, the shaft 215 transmits motion to the shaft 207 which carries two cord pulleys 208 over which pass cords 206 which are also passed over rolls 210 and 218. The rolls 218 are mounted on the outer ends of flat bars 217, which are attached to the two sides of the attachment 212 and, with the ropes or cords 206, serve the same purpose as the fork 130 of Figs. 18 and 19.

The food-paste threads fall on to a saddle 204, which is fastened on the attachment 212 by means of supports 205, slide thence on to the ropes 206 and are carried along by the upper length of the latter, in the direction indicated by the arrow, into the machine. The transmitter, which serves the purpose of taking the threads off the ropes 206, is again rotatably mounted on a pivot 122 in the outer end of the arm 123. It is preferably furnished with ribs or projections 219 which divide the threads into separate groups. In order to prevent the transmitter from getting the threads into disorder in removing them from the ropes, it is essential that, at the moment of engaging with the threads, it should be almost entirely stationary with regard to them. To obtain this result the arm 123 of the transmitter is provided with a long nave or boss 225 capable of being slid along the shaft 93, but is made to revolve with the shaft 93 by means of a pin 220 projecting through a slot 221 in the nave. A spring 224 slipped over the shaft 93 presses against the nave 225 and is supported at the other end by a ring or collar 230, while the arm 123 is provided on its rearward extension with a guide curve 222 for the purpose of working, during the turning of the transmitter, in conjunction with a roll 227, the gudgeon 226 on which is mounted in a fork 228 on the attachment 229 of the bearing standard 96.

Shortly before the transmitter rod 121, passing between the ropes 206, engages with the threads, an ascending portion of the guide curve 222, which encounters the roll 227, has pushed the transmitter toward the left, in the position shown in Fig. 23. While the threads are being engaged, a descending portion of the guide curve moves the transmitter longitudinally backward to an extent corresponding almost or completely with the advance of the rope in the direction of the arrow in Fig. 22, and continues until the threads have been taken off the ropes. When this has been accomplished, the transmitter remains in the axial position shown in Fig. 22, so that the contact 126 can engage with the star 125, and the threads are delivered to the winding or hanking device of Figs. 18 and 19 in an orderly manner by the further rotation of the transmitter. While the transmitter is moving from the position of Fig. 23 to that of Fig. 22, the threads have moved onward, as shown by the unbroken lines in Fig. 22, whereas, at the moment of transference they occupied the space bounded by the dotted lines.

The manner in which the threads are placed upon the saddle 204 or the ropes 206 is immaterial. In the case of a skilled attendant this operation can be performed by hand, the threads being laid on the saddle 204 or directly on the ropes 206, instead of on the fork 130 of Figs. 18 and 19. The device is also specially adapted for cut threads prepared just before they are fed into the machine. Fig. 22 shows (diagrammatically) a typical arrangement of a vermicelli-cutting machine, consisting of a cutter revolving on the shaft 201, the blades 200 of which cutter continuously sever threads from the rolled sheet of paste 202, fed from above on a support 203, which threads are thrown on the saddle 204 and slide down on to the ropes 206.

In the device according to Figs. 24 and 25, the threads are hung on bars 231 outside the machine, which bars take over the part of the transmitter 121 used in the above described examples and when filled are placed one after another in the machine, from which they are removed when empty. This makes the operation independent of the skill of the attendant, since the bars can be hung with threads by any number of assistants, and the machine will take the threads from the bars automatically and wind them into hanks.

It is to be understood that that part of the machine (shown on the right in Figs. 18 and 19) which serves to receive the hanks, divided off by hand or otherwise, such part comprising particularly the fork 130, is situated outside of, or separated from, the machine.

For the reception of the bars 231 loaded with threads there is mounted on the machine frame 32 a frame consisting of a cross beam 232 with bearing arms 233, 234 and two curved bearing supports 235, 236, connected together and with the cross beam 232 by means of the cross bars 237, 238, 239. The bearing arms 233, 234 support a through shaft 240 with chain wheels 241, 242, and the bearing supports 235, 236 carry short shafts 243, 244 with chain wheels 245, 246. The chain wheels are connected by chains 247, 248, each of which is supported by a longitudinal bar 249, carried on supports 262, 263, and is provided with teeth 250, between which the filled bars 231 are inserted.

The shaft 240 is connected with a ratchet wheel 251, and carries a loosely mounted setting arm 253, fitted with a pawl 252, the said arm being drawn down by a spring 255, attached to the arm 254 of the frame, to such an extent that the contact arm 256 encounters the contact 257. When the transmitter arm 123 is turned, a guide curve or cam edge 258 attached thereto comes in contact with the roll 259 of the setting arm 253 and turns the latter with the pawl idly over the ratchet wheel 251. If, as is assumed in Fig. 24, the roll 259 is able to move back along the descending portion of the cam edge 258, then, under the influence of the spring 255, the pawl 252, with the ratchet wheel 251 and the chains 247, 248, is moved forward a distance corresponding to that between two successive bars 231.

For removing the front bar 231, two arms 123, 123' are provided on the shaft 93, in place of the one transmitter arm 123 of the devices hereinbefore described. To correspond with the pin 122 and star 125 of the one transmitter arm 123, a pin 122' and star 125' are provided on the other transmitter arm 123', while to correspond with the existing contacts 126, 127, 128 on the rear bearing standards 96, similar contacts 126', 127' 128' are provided on the front bearing standards 96', which are connected with the rear bearing standards by means of the traverse 97. Whereas, however, the transmitter rod 121 was, as hereinbefore described, rigidly connected with the pin 122, the pins 122, 122' now carry turning blocks 260, 260' with U-shaped recesses into which fit the ends of the rods 231.

When the transmitter arms 123, 123' are turned, the turning blocks 260, 260' carry with them the ends of the foremost bar 231 and turn the latter in the same manner as the aforesaid transmitter rod 121 was moved and turned. In the position shown for the transmitter arms the turning blocks 260, 260' are so turned by the contacts 156, 156', which engage with the stars 125, 125', that the bar is brought into the position 231' tangential to its circuit, the openings in the turning blocks being by that time turned upward. When the transmitter arms are turned farther, the bar is consequently ejected from the turning blocks by the ejector arms 254, 254' provided on the cross beam 232, and falls into a channel 261, along which it can slide outward to be caught by hand or in a receiver. After the bar has been ejected, the stars 125, 125', coming in contact with the pins 127', 128' of the front bearing standards and the corresponding pins of the rear bearing standards, turn the turning blocks 260, 260' through an angle of 180 degrees, so that their openings point upward and the next bar can be taken up, this having meanwhile, been pushed into the front place by the pawl 252 under the influence of the cam 258 and the spring 255.

Fig. 26 shows in elevation the under frame of a hanking machine of the kind illustrated in Figs. 18 and 19; and Fig. 27 is a view from the right hand side of Fig. 26. Both figures explain how the trays are arranged in a specially advantageous manner before and after being loaded with hanks of food-paste. To obviate inserting and removing the trays into and from the machine one by one, they are piled up one above another on both sides of the flaps, or of the bearing standards of the rake shaft, one pile containing the empty trays and the other the full ones. As soon as a tray is full of hanks it is placed on the "full" pile, and the top tray from the pile of empties is inserted in the winding machine. Both the piles of empty and full trays are preferably mounted on rising and falling platforms, so that the pile of empty trays rises by the height of one tray every time an empty tray is to be transferred into the hanking machine, and the pile of full trays descends to an equal extent whenever a fresh tray is placed on it. Consequently the uppermost tray is always on the one level, and can be conveniently pushed into the machine when empty and with equal ease be placed on the pile of full trays when full, while during the gradual advance when being loaded with food-paste hanks it can slide on the pile of empty and full trays.

In the device according to Figs. 26 and 27, the ascent of the empty trays and the lowering of the full trays are effected by the machine itself, a new tray being automatically inserted at the same time into the hanking machine.

The under frame of the Figs. 26, 27 carries the bearing standards of the winding device on two side pieces 32, which are connected together by cross bars 264. The pile of empty trays rests on a platform 265, capable of vertical movement, and suspended from the chains 267 by means of carrying pieces 266 at the four corners, in such a manner that, when the chain wheels 268 carrying the chains are turned in the same direction, all four corners of the platform are raised or lowered simultaneously. The upper chain wheels 268 are connected in pairs by the shafts 269, 270, while the lower chain wheels are mounted loosely on the pins 271, 272. An auxiliary chain 273 (Fig. 27) which is led over corresponding auxiliary chain wheels, establishes connection between the chain wheels of one side with those of the other. Hence the chain wheels 268 turn to an equal extent if the shaft 270, projecting over the machine frame, is turned by means of the hand wheel 274 or the ratchet wheel 275.

In the same way the pile of full trays is carried by a platform 265', which is suspended on the chains 267', by carrying pieces 266' on its four corners, in such a manner that all four corners of the platform are raised or lowered simultaneously on the chain wheels 268' being turned. The chain wheels 268' are worked in the same way by means of the hand wheel 274' or a ratchet wheel 275' provided at the side of the machine frame on the shaft 270', the motion being transmitted from one side to the other by means of the auxiliary chain 273'.

On the side next the empty trays, the platform 265 and the trays on the same must be raised when a fresh tray is fed into the machine, this raising being effected by means of a pawl 276, provided on a setting arm 277, which is loosely mounted on the shaft 270. The setting arm 277 is operated by a coupling rod 278, connecting the counter-arm 279 of the setting arm with the arm 280 of a shaft 281 mounted on the frame of the machine. A locking pawl 283 fitted with a handle 284, prevents the ratchet wheel 275 from moving back during the return stroke of the pawl 276.

On the side next the full trays, the platform 265' and the trays with which it is laden, tend to ascend under the influence of a counterweight 285. During the descent of the platform, the pawl has to overcome the excess weight of the counterweight, so that with the platforms 265 and 265' suspended in the same manner, the ratchet wheel 275' which is prevented from turning backward by the locking pawl 283' (fitted with the handle 284') must have teeth pointing in the opposite direction to those of the ratchet wheel 275. The coupling rod 278', which is connected with the counter arm 279' of the setting arm 277' and is articulated on an arm 280' of the shaft 281, consequently moves the ratchet wheel 275' forward when the pawl 276 is simultaneously moved backward empty over the ratchet wheel 275 by means of the coupling rod 278 exactly opposite to the coupling rod 278'.

The shaft 281 is turned to and fro by means of a coupling rod 286, which is connected with the arm 282 by a toggle joint 287, and with the arm 290 (fixed on the shaft 289) by a second toggle joint 288. The shaft 289 carries a driving arm 291, which is connected by a coupling rod 292 with the pin 293 of a crank disk 294, loosely mounted on the revolving main shaft 31. A pawl 295 mounted in the crank disk 294 is pushed in opposition to the action of a spring 296 provided on the crank disk 294, out of the path of a tooth 298 which is provided on the disk 299 firmly attached to the main shaft 31. The arm 297 turns on a pivot 300 on the machine frame and is connected by means of a coupling rod 301, with the vertical arm 302, with the shaft 303 of which is connected a double lever whose one arm 304 is engaged by a spring 305 while the other arm 306 rests against one of the side rods of the tray 23.

The device works in the following manner: As soon as one end of the tray 23 has passed under the end of the lever arm 306, the spring 305 pulls down the lever 306 and, by means of the arm 302 and the coupling rod 301, removes the arm 297 from the pawl 295, which is then pressed by the spring 296 against the disk 299, and is carried, with the crank disk 294, by the tooth 298 in the direction indicated by the arrow.

During the first half revolution of the crank disk 294, the coupling rods 278, 278' are moved upward by the downwardly moving coupling rod 286, the ratchet wheel 275 on the side next the empty trays being pushed forward and the platform 265 raised by the height of a tray, while on the side next the full trays, the pawl 276' passes empty over the ratchet wheel 275'. At the same time the rod 308 is moved laterally by means of a lever 307 connected with the shaft 289, so that the downwardly bent hooked end 309 of the rod 308 comes into position behind the top empty tray.

During the second half revolution of the crank disk 294, the coupling rods 278, 278' are moved downwardly by the ascending coupling rod 286, so that now the ratchet wheel 275' on the side next the full trays is pushed onward, whereby the platform 265', with the trays, is depressed, while the pawl on the side next the empty trays returns empty above the ratchet wheel. At the same time the rod 308 makes its return stroke, the hooked end 309 carrying the top empty tray so far forward that it is engaged by the feed roller 26 and the roll 61 (which is pressed against the tray by the arm 59 and spring 60), and can be advanced in the ordinary course.

When the crank disk 294 has completed a revolution, the rear end of the pawl 295 comes in contact with the arm 297, which on the ascent of the arm 306 was already returned to the position shown, by the top empty tray during the first semi-revolution. The pawl 295 is hereby removed from the tooth 298, and the crank disk remains at rest until the fresh tray has been pushed under the end of the arm 306.

The frame shown as a lateral elevation in Fig. 28 is for the purpose of feeding a number of superimposed trays into or removing them from the machine simultaneously. The frame consists essentially of a horizontal girder or beam 310 and a laterally mounted vertical girder 311, from which two horizontal angle-iron bars 312 project toward the side of the machine, the pile of trays 313, indicated by the dotted lines, resting on the horizontal flanges of these angle-irons.

The frame 310 is preferably mounted on wheels or rollers 314, whereby the frame assumes the form of a carriage and becomes more easily movable. The vertical girder 311, which is connected with the frame 310 by a tie-plate 315, has a curved extension 316, which is provided with handles or handle bars 316 for moving the carriage, and supports the carrier bars 312 by means of a strong tie-plate 317. A cross bar 318 also supports the vertical angle-iron bar 319 on either side of the frame, against the rear flange of which bar the trays forming the pile can rest.

In order to transfer the pile of trays 313, supported by the frame of Fig. 28, to the platform 265 of Fig. 26, the vacant platform is depressed, by raising the pawls 276, 283 and turning the handle 274, so that the surface of the board 320 on the platform is nearly or quite on a level with the upper edge of the cross bar 321 of the machine frame. Since the lateral guide plates 322 (for the pile of trays), which are attached, partly to the cross bars 264 (Fig. 27) and partly to the cross bars 323, are splayed out at the bottom as shown at 324 and since there are recesses 325 provided in the platform 265, preferably by taking off the board 320, the fully laden tray frame can be pushed or run into the machine in such a manner that, when the platform 265 is depressed, the angle-iron bars 312 enter the machine above the cross bar 321 and platform 265, as shown by the dotted lines in Fig. 26. If now the platform 265 is slightly raised by means of the hand wheel 274, it removes the pile of trays from the angle-iron bars 312 by means of the board 320, or a corresponding projection and the frame can be removed from the machine again, whereupon the trays can be raised to the working level by means of the hand wheel 274.

On taking the filled trays from the platform 265' the latter and the trays are depressed until the angle-iron bars 312 of the empty tray frame can be inserted into the recesses 324', 325'. The platform being then depressed a little further, the pile of trays is taken up by the horizontal angle-iron bars of the tray frame and can be removed from the machine along with the latter, whereupon the platform is raised to its highest position by lifting the pawls 276', 283'.

In the above description, and in the claims that follow, the word "threads" is employed to designate the portions of food-paste handled by the machine. We desire the word "thread" to be understood as implying any form into which the food paste may be brought, in the individual pieces or items being long in proportion to their width or thickness and in which the food paste or the like has sufficient cohesiveness to retain such a form while being handled by the machine. In the same way where, in the claims the expression "shredding machine" or "means for shredding" is used it implies any suitable apparatus adapted to bring the food-paste or other substance in the form referred to.

What we claim and desire to secure by Letters Patent of the United States is:—

1. In a machine for hanking threads comprising a delivery surface adapted to receive the threads, a folder rod or pin adapted to take up said threads from below during their delivery to the aforesaid surface and to form a loop in said threads, means for moving the rod relatively to the surface in the direction of the length of the threads thereby permitting the threads to be stretched on both sides of the fold, and means for withdrawing the rod in the backward direction thereby permitting the upper stretched layer to fall down on the under layer, the formed bend or loop of the threads retaining its place.

2. In a machine for hanking threads the combination of a delivery surface, means for delivering said threads to said surface, means extending transversely of the delivery surface and over which said threads can be folded, means for moving said transversely extending means relatively to said delivery surface in the direction of delivery, and thereby folding and simultaneously stretching said threads and for returning said transversely extending means in the opposite direction, thereby permitting said threads to remain upon the delivery surface, substantially as described.

3. In a machine for hanking threads, a plurality of hooks arranged in a row and having ends diverging from the center lines of the several hooks, and a head in which said hooks are supported in such manner as to be rotatable about their aforesaid center lines.

4. In a machine for hanking threads, a plurality of hooks arranged in a row, said hooks all having their ends bent in the same direction from their respective center lines, and a head in which said hooks are mounted in such manner as to be rotatable about said center lines.

5. In a machine for hanking threads, a plurality of hooks arranged in a row, said hooks all having their ends bent in the same direction from their respective center lines, a head in which said hooks are rotatably mounted, and means whereby they are so connected together that all the hooks can be turned simultaneously about their own center lines.

6. In a machine for hanking threads, a plurality of hooks arranged in a row, a head or bar in which said hooks are so mounted as to be rotatable about their individual axes and means whereby said hooks are so connected together that they can be turned simultaneouly about said axes without turning said head or bar.

7. A machine for hanking threads provided with hooks the deflected portion of which, beyond the bend, can be rotated about the longitudinal axis of the shank portion for the purpose of taking up and delivering the threads.

8. In a machine for hanking threads a head or bar, a plurality of folders comprising single-part hooks or rods of a bent shape having their stems or shanks arranged in a row in said head or bar in such manner as to be rotatable about their own longitudinal axes and having the part thereof beyond the bend directed in a plane at an angle to the plane of said stems or shanks to permit of or facilitate the introduction of the aforesaid threads, and a delivery device adjacent said hooks for the reception of said threads.

9. In a machine for hanking threads the combination of a folder adapted to receive crosswise the threads, means for advancing said folder in such manner as to stretch said threads and at the same time deposit them in a double layer, and a delivery device adapted to receive said double layer, such surface being partly formed by a flap or hinged leaf.

10. In a machine for hanking threads the combination of a folder adapted to receive crosswise the threads, means for advancing said folder in such manner as to stretch said threads and at the same time deposit them in a double layer, and a delivery device adapted to receive said double layer, said delivery device being formed in two parts, one of which comprises a frame angularly movable relatively to the other part and a supporting surface on said frame lineally movable relative thereto.

11. In a machine for hanking threads the combination of a delivery device for receiving the threads, such device being formed in two parts one of which comprises a flap pivotal relatively to the other part, a folder rod or pin adapted to take up said threads from below during their delivery to the aforesaid delivery device and to form a loop in said threads, and means for moving said folder rod or pin as far as the outer end of the aforesaid flap and withdrawing same backward from the aforesaid loop.

12. In a machine for hanking threads the combination of a folder adapted to engage said threads, and means for advancing said folder in such manner as to lay the threads in a double layer and at the same time stretch said threads, and a delivery device comprising a flap movable on a stationary pivot and adapted to receive said double layer and then to be turned down on its pivot so as to discharge same.

13. In a machine for hanking threads, the combination of a folder adapted to engage the threads, means for advancing said folder in such manner as to fold said threads and lay them in a double layer and at the same time stretch them, a receiver for said threads comprising a plurality of flaps hinged relatively to each other in such manner that turning over one of the flaps it will lay the threads upon the adjacent flap, and means for permitting the angle of a flap to be adjusted in the direction of discharge or final delivery of the threads.

14. In a machine for hanking threads the combination of a plurality of hooks arranged in a row and on which the threads can be lapped, means for supporting said hooks, said hooks being rotatable about the longitudinal axes of their respective stems or shanks, means for moving the paste threads in relation to the hooks so that the latter can pass between the threads, means for causing same to release the threads when the hooks have taken the threads up, and means for causing the hooks to be turned about their aforesaid respective axes after they have passed between the threads.

15. In a machine for hanking threads the combination of a plurality of hooks arranged in a row and over which the threads can be lapped or folded, means for supporting said hooks, said hooks being rotatably about the longitudinal axes of their respective stem or shank portions, means for moving the threads in relation to the hooks in such a manner that the latter can pass and engage the threads, such means comprising a rod 121 over which the threads can be caught up and suspended and means 130 for supporting the threads and having an opening, the aforesaid rod being adapted to carry the threads with it away from said supporting means by passing through the said opening therein.

16. In a machine for hanking threads the combination of a supporting device adapted to receive and support said threads at a plurality of points and to leave a part of the same free, a delivery device adapted to receive said threads from the aforesaid supporting device, and means adapted to take up the threads at the aforesaid free part from the supporting device and deliver them to said delivery device.

17. In a machine for hanking threads, the combination of a supporting device adapted to receive and support said threads at a plurality of points and to leave a part of same free, said supporting device being capable of being moved to and from the position in which it is intended to receive its charges of threads, a delivery device adapted to receive said threads from the aforesaid supporting device and means adapted to take up the threads at the aforesaid free part from the supporting device and deliver them to said delivery device.

18. In a machine for hanking threads the combination of means for supporting depending threads, means for cutting same into lengths, a support adapted to receive the cut threads by gravity, such support comprising a plurality of spaced supporting parts, a rod, and means for actuating said rod so as to lift the threads from said support.

19. In a machine for hanking threads the combination of a plurality of hooks arranged in a row and over which the threads can be lapped or folded, means for supporting said hooks, means for supporting said threads in such manner as to leave a part of said threads free, means for moving the threads from said supports in relation to the hooks, such means comprising a rod, adapted to take up said threads at the aforesaid free parts of the same, and cause said threads to hang over said rod, and means for actuating said rod.

20. In a machine for hanking threads the combination of a hanking device, means for supporting the threads, a rod, and means for operating said rod so as to pass same under said threads, take up said threads, thereby in a hanging position over said rod, and feed them to said hanking device.

21. In a machine for hanking threads the combination of a hanking device, means supporting the threads in such manner as to leave a part of the same free, a rod, and means for operating said rod so as to take up said threads at the free part thereof into a hanging position over said rod and feed them to said hanking device.

22. In a machine for hanking threads the combination of a supporting device adapted to receive the threads at a plurality of points in such manner as to leave parts of the same free, means for moving the supporting means, a rod, means for passing said rod in proximity and parallel to said points of support and operating same, so as to lift the threads and thereby hang said threads over the rod, and means for receiving the folded threads.

23. In a machine for hanking threads the combination of means for supporting depending threads, means for cutting same into lengths, a support adapted to receive the cut threads by gravity, such support being adapted to receive the threads transversely at a plurality of points, a rod, and means for adjusting said rod so as to lift the threads from said support.

24. In a machine for hanking threads the combination of a supporting device adapted to receive the threads transversely at a plurality of points, means for moving the supporting means, a rod, means for passing said rod in proximity and parallel to said points of support so as to lift the threads, a hanking device comprising means for folding the threads, means for receiving the folded threads, and means whereby the supporting means and the rod have substantially no relative motion in the direction of their length while the threads are being lifted.

25. In a machine for hanking threads the combination of a plurality of spaced supports adapted to receive the threads, means for moving said supports in unison, a rod, means for passing said rod between said spaced supports so as to lift the threads, a hanking device comprising means for folding the threads, means for receiving the folded threads, and means whereby the spaced supports and rod have substantially no relative motion in the direction of their length while the threads are being lifted.

26. In a machine for hanking paste threads the combination of a plurality of hooks arranged in a row and over which the threads can be lapped or folded, means for supporting said hooks, and means for moving the paste threads in relation to the hooks and in such a manner that the latter pass between and engage the paste threads, such means comprising a rod over which the paste threads are suspended, and said rod moreover being adapted to be inserted into the hanking device while loaded with the threads and removed therefrom when emptied.

27. In a machine for hanking paste threads the combination of a plurality of hooks arranged in a row and over which the threads can be lapped or folded, means for supporting said hooks, and means for moving said paste threads in relation to the hooks in such a manner that the latter pass between and engage the paste threads, such means comprising a rod over which the paste threads are suspended, and means for inserting said rod into the hanking device while loaded with the threads and for removing the same therefrom when empty, and means operative on the removal of said last named rod to move the adjacent rod into said operative position.

28. In a machine for hanking threads means for folding or doubling said threads, a delivery device adapted to receive the threads from the folding means, a platform, a plurality of empty trays thereon, a pair of rolls for pushing the topmost of said trays into filling position relatively to the delivery device, separated means for feeding the top empty trays to said rolls, means for thereupon raising said platform, another platform for the reception of the filled trays and separated means adapted to coöperate with the aforesaid tray-moving means to depress the last named platform.

29. In a machine for hanking threads, means for folding or doubling such threads, a delivery device adapted to receive the threads from the folding means, a platform preferably comprising two angle bars adapted to support a plurality of trays, and a portable frame to carry said platform and capable of being moved away from the machine so that when the platform it carries has received a pile of filled trays said trays may be removed and replaced by empty trays.

In testimony whereof we have hereunto set our hands in presence of two subscribing witnesses this 5th day of February 1908.

OTTO EBERHARD FUNCK.
PAUL WILHELM FUNCK.

Witnesses:
ANTON GERSTACK,
EUGEN MARTIN LOUIS WAGNER.